US012552997B2

United States Patent
Harley et al.

(10) Patent No.: US 12,552,997 B2
(45) Date of Patent: Feb. 17, 2026

(54) TARGETED DISULFIDE REDUCTION IN PETROLEUM MATRICES

(71) Applicant: CHEVRON U.S.A. INC., San Ramon, CA (US)

(72) Inventors: Stephen J. Harley, Richmond, CA (US); Rachel Mohler, Richmond, CA (US); Peter Hillman, Pleasanton, CA (US); Samin Sharifiasl, Oakland, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 211 days.

(21) Appl. No.: 18/498,612

(22) Filed: Oct. 31, 2023

(65) Prior Publication Data

US 2024/0141238 A1   May 2, 2024

Related U.S. Application Data

(60) Provisional application No. 63/421,162, filed on Oct. 31, 2022.

(51) Int. Cl.
*C10G 27/04* (2006.01)
*G01N 30/06* (2006.01)
*G01N 30/02* (2006.01)
*G01N 30/88* (2006.01)

(52) U.S. Cl.
CPC .............. *C10G 27/04* (2013.01); *G01N 30/06* (2013.01); *C10G 2300/202* (2013.01); *G01N 2030/025* (2013.01); *G01N 2030/067* (2013.01); *G01N 2030/8854* (2013.01)

(58) Field of Classification Search
CPC .............. C10G 2300/202; C10G 27/04; G01N 2030/025; G01N 2030/067; G01N 2030/8854; G01N 30/06
See application file for complete search history.

(56) References Cited

PUBLICATIONS

Determining Disulfides in Petroleum Naphtha (Year: 1958).*
Isolation and Characterization of Sulfur Compounds (Year: 1967).*
Hubbard, et al., "Quantitative Determination of Organic Disulfides", Analytical Chemistry, Jan. 1958, pp. 91-93, vol. 30, issue No. 1, Petroleum and Oil-Shale Experiment Station, U. S. Bureau of Mines, Laramie, Wyo.
Erlandsson and Mattias Hallbrink, "Metallic Zinc Reduction of Disulfide Bonds between Cysteine Residues in Peptides and Proteins", International Journal of Peptide Research and Therapeutics, vol. 11, No. 4, Dec. 2005, pp. 261-265, Springer Science+Business Media, Inc.

* cited by examiner

*Primary Examiner* — Ellen M Mcavoy
*Assistant Examiner* — Chantel Graham

(57) ABSTRACT

The present invention is directed to a method of selectively reacting and removing disulfides and reducing corrosivity in petroleum matrixes with an acid wash composition.

9 Claims, 6 Drawing Sheets time, min.

TARGETED DISULFIDE REDUCTION IN PETROLEUM MATRICES

CROSS-REFERENCE TO RELATED APPLICATIONS

This application claims the priority benefit of U.S. Provisional Patent Application No. 63/421,162, filed Oct. 31, 2022, which is incorporated by reference herein in its entirety.

FIELD OF THE INVENTION

This invention relates to the reaction and removal of disulfides from petroleum matrices.

BACKGROUND OF THE INVENTION

Gas chromatography is a powerful technique whose ability to speciate complex mixtures is unparalleled in the petroleum industry. However, its ability to separate complex mixtures is limited and there can be hindrances to analysis. The need for a retention time library to accurately identify the >4,000 separated components is not practical as a name assignment is more of an academic exercise than a practical endeavor. Rather, element-specific detectors, class speciation, and chemical modifications are employed to allow the analyst to down select and parse out the specific species of interest by group, carbon number, or group reactivity. It is this chemical identity that is practical to the needs of refinery engineers. Compounds of Sulfur exist in different forms that can be categorized into four groups namely: disulfides, mercaptans, thiophenes and sulfides. However, even with these analytical approaches, a specific subclass of sulfur compounds, disulfides, has eluded identification efforts.

Identification of chemical constituents in petroleum samples at trace levels using Gas Chromatography with a Sulphur Chemiluminescence Detector (GC-SCD) or a multidimensional chromatography technique such as comprehensive two-dimensional gas chromatography (GC×GC, GC×GC, 2DGC, GC×GC, GC×GC) is currently aided by the use of chemical modifications of sulfides with peroxide/acid oxidation or mercaptans with base extraction from the matrix. Thus analyzing which peaks disappear pre and post chemical modification allows the analyst to flag specific species depending on the nature of the wash employed. Disulfides proved more difficult and required looking at the natural processes involved in disulfide formation inherent to petroleum extraction and refining to come up with an appropriate wash.

The presence of high sulfur-containing compounds in petroleum process streams could cause corrosion of piping and fittings and equipment, thereby damaging process piping. Therefore treatment and reduction of disulfide species within petroleum stream processing is also desired.

For a wash to be successful in this approach it must selectively remove only the species of interest and have limited or known interaction with other species.

SUMMARY OF THE INVENTION

A method of selectively reacting and removing disulfides in petroleum matrixes with an acid wash composition to determine precise boiling point and concentration of disulfide species.

A method of identifying disulfides within a gas chromatography sample by reacting a petroleum matrix with an acid wash composition.

A method of reducing corrosivity in a petroleum processing system by selectively reacting disulfides within the petroleum matrix with an acid wash composition and/or a composition containing a disulfide wash and mercaptan wash solution.

DETAILED DESCRIPTION OF THE INVENTION

Figure 1:
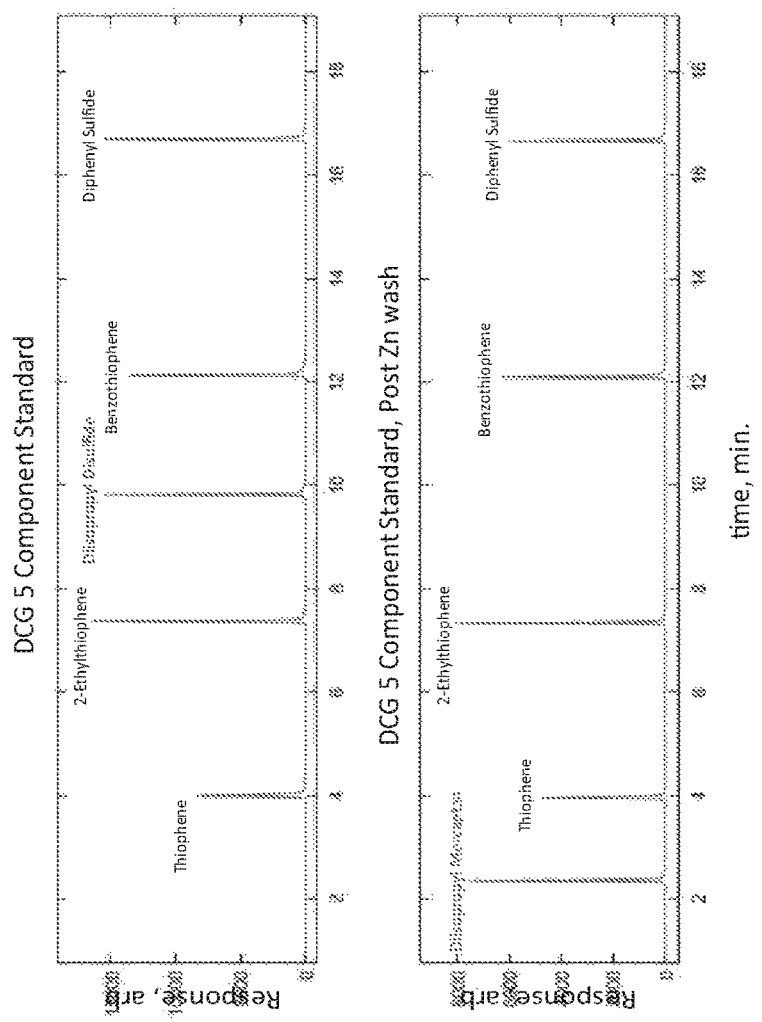
FIG. 1 is a chromatogram of a composition comprising 5 sulfur components from purchased standards. The component mixture contains a disulfide, thiophene, benzothiophene, and sulfide. Only the disulfide was eliminated by the wash creating the corresponding mercaptan as dictated by rxn. 2. All other peaks remained constant in relative amplitude.
Figure 2:
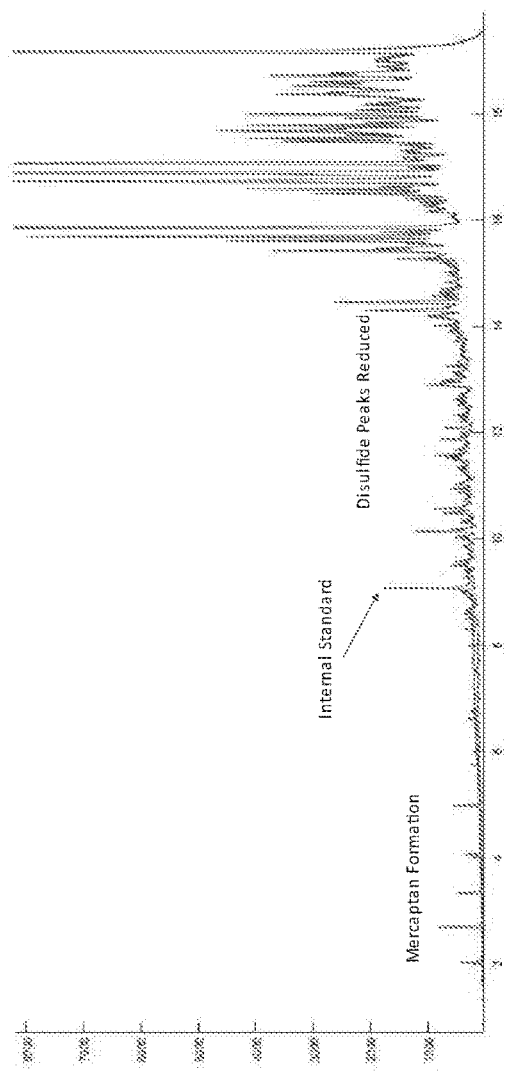
FIG. 2 is a chromatogram of pristine Isthmus crude, blue, with internal standard and disulfide washed crude, red, on sulfur backflush. The pristine crude shows minor coalesced peaks reducing post-wash with the creation of mercaptans indicating a disulfide rich sample.
Figure 3:
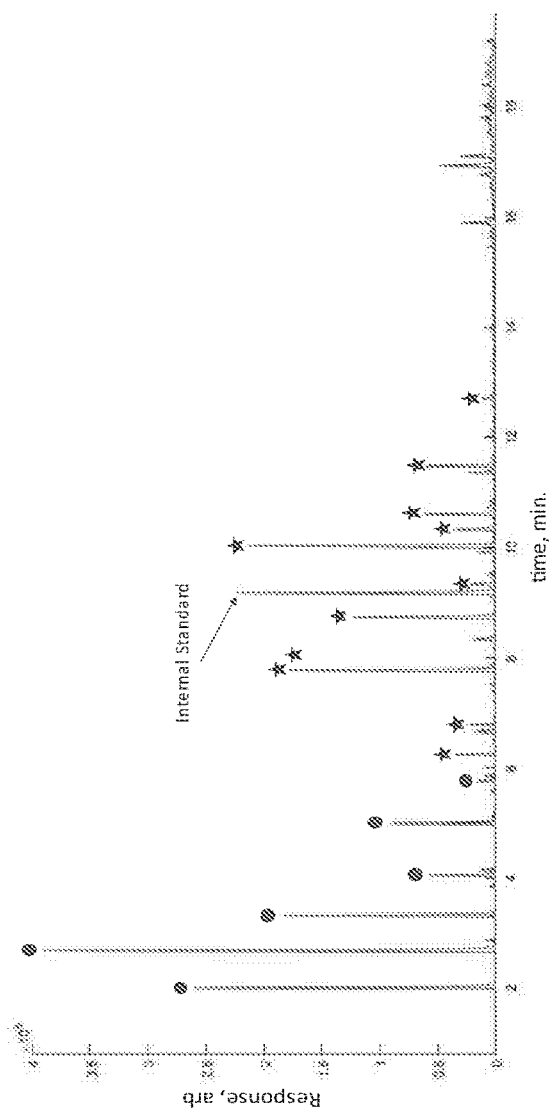
FIG. 3 is a chromatogram of pristine Karachaganak crude, blue, with internal standard and disulfide washed crude, red on sulfur backflush. The pristine crude shows large disulfide peaks, blue stars, that wash out and create corresponding mercaptans in the disulfide wash chromatogram, red circle. This sample was found to contain native mercaptans as well as native disulfides.
Figure 4:
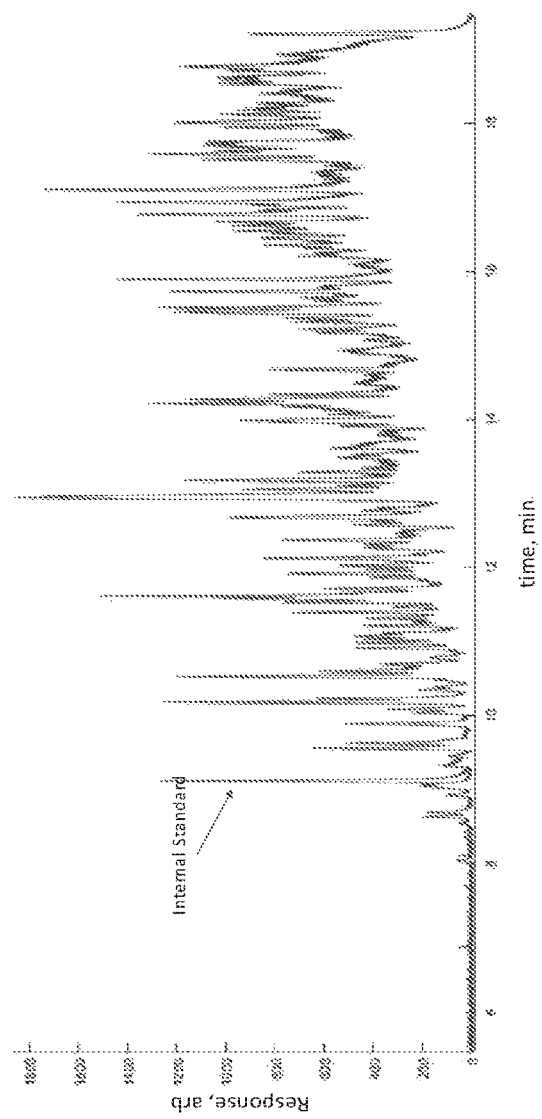
FIG. 4 is a chromatogram of Peregrino crude on sulfur backflush. Unreacted crude, blue, has internal standard added for reference. Disulfide wash, red, overlays almost identically with an unwashed chromatogram. Peregrino is mostly sulfides and is thiophenic rich, with no disulfides present. Further, no reduction in non-disulfide peaks was observed.
Figure 5:
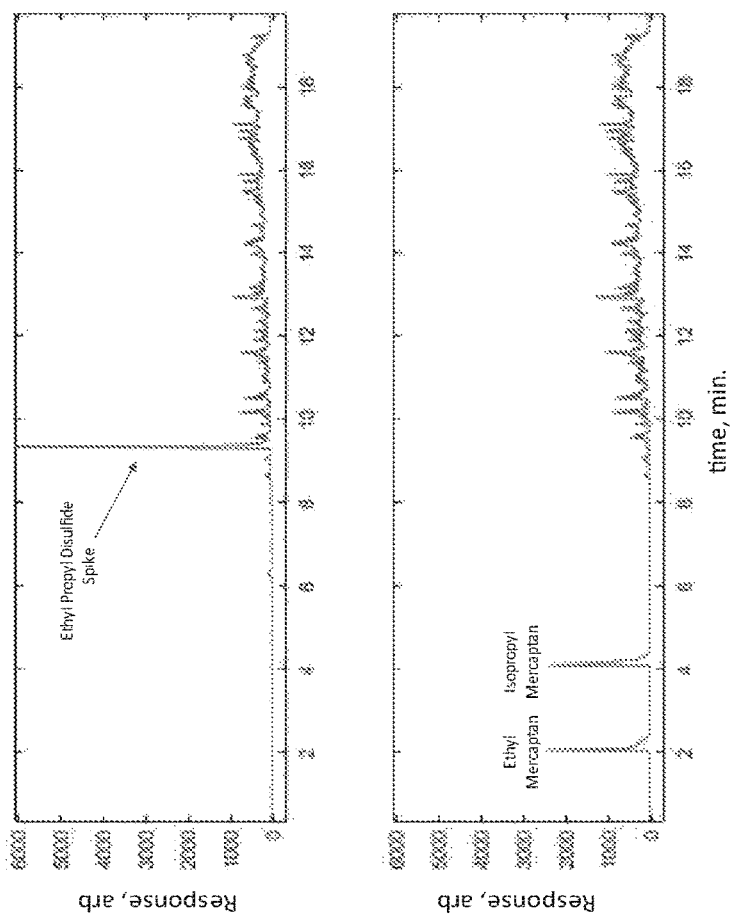
FIG. 5 is a chromatogram of ethyl isopropyl mercaptan spiked Peregrino crude on sulfur backflush, blue. Disulfide wash, red, shows corresponding mecaptans generated corresponding to parent disulfide spike. The sum of the mercaptan integrals equals the integral of the disulfide spike.
Figure 6:
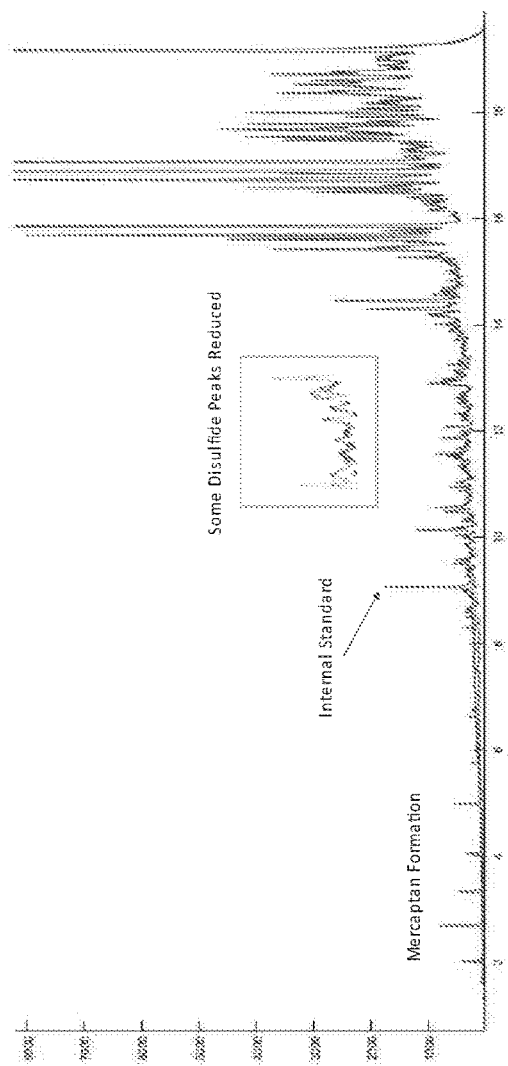
FIG. 6 is a chromatogram of pristine Isthmus crude, blue, with internal standard and disulfide washed crude, red, on sulfur backflush. The pristine crude shows minor coalesced peaks reducing post-wash with the creation of mercaptans indicating a disulfide rich sample. The inset shows the attenuation of signal from disulfides.

Herein is described a method of selectively reacting and removing disulfides in petroleum matrixes with an acid wash composition to determine precise boiling point and concentration of disulfide species in the identification of chemical constituents in Gas Chromatograph with a Sulphur Chemiluminescence Detector (GC-SCD) or a multidimensional chromatography technique such as comprehensive two-dimensional gas chromatography.

A method for reducing corrosivity in a petroleum processing system by selectively reacting disulfides within the petroleum matrix with an acid wash composition is also described herein.

"Petroleum matrix" is defined as all stages of liquid phase petroleum processing within a refinery including initial crude.

Within petroleum matrices, disulfides are typically created either by the intentional (MEROX) or unintentional, air leakage, oxidation of mercaptans:

RSH+R'SH→RSSR',    rxn. 1

This resulting disulfide bond is known to be susceptible to nucleophilic attack, most notably by triphenylphosphine. However, this reaction does not appear to be kinetically favorable in petroleum matrices. An alternate route of reduction of the disulfide bond on a zinc surface is utilized herein:

RSSR'→RSH+R'SH,    rxn. 2

The acid serves a dual purpose of providing protons for hydrogen rearrangement and it also cleans the surface of the zinc and allows for a reaction. It is zinc that is the reducing agent that is key here as it provides the electrons for the reduction of mercaptans into disulfides.

The acid wash of the invention is performed with a weak acid, known to one of skill in the art and referred to herein throughout as a compound that is not a strong enough proton donor to be entirely converted to hydronium ions in aqueous solution, herein including but not limited to carboxylic acids and oxyacids acids. A preferred embodiment of the invention is the use of acetic acid.

Surfaces other than zinc may be employed and are contemplated for use within the invention, chiefly, any reductive metal of sufficient reductive capacity known to one of skill in the art could provide the chemical potential needed to drive the reaction. These surfaces may include but are not limited to magnesium, aluminum, cadmium, copper, nickel or reductive organics like sodium borohydride.

An embodiment of the invention is the method as described above wherein reaction conditions of the wash composition within GC-SCD of GC×GC are proton mediated –3% to 6%, preferably 5%, weak acid solution and in constant contact with an aqueous phase at a minimum of 45° C. under constant agitation for a minimum of 40 minutes. A preferred embodiment is an aqueous phase at 50° C., constant agitation for at least 50 minutes and a 5% acetic acid solution in an equal volume to the suspected disulfide hydrocarbon phase was found to be optimum.

Disulfides as used herein refers to disulfides within petroleum matrices known to one of skill in the art which may include but are not limited to methyl disulfide, ethyl disulfide, n-propyl disulfide, n-butyl disulfide, n-amyl disulfide, n-octyl disulfide, n-decyl disulfide, isopropyl disulfide, sec-butyl disulfide, cyclo-pentyl disulfide, tert-butyl disulfide, tert-amyl disulfide, phenyl disulfide, benzyl disulfide, p-tolyl disulfide.

An embodiment of the invention is a method of reducing corrosivity in a petroleum processing system by selectively reacting disulfides within the petroleum matrix with an acid wash composition, see example 1. A further embodiment of the invention is the use of a disulfide/mercaptan wash composition to reduce corrosivity within a petroleum matrix or processing thereof. The mercaptan wash solution comprises a solution of about 20% (wt/wt) sodium hydroxide in methanol, this is called base wash solution. The hydrocarbon containing the mercaptans is washed with an equal volume of base wash by rigorously shaking the biphase mixture for at least 4 minutes, preferably at least 5 minutes.

Table 1 shows the reduction in corrosivity using a disulfide wash and disulfide/mercaptan wash when compared to baseline.

TABLE 1

| Disulfide Wash | 31% |
|---|---|
| Disulfide, Mercaptan Wash | 84% |

Examples below demonstrate the method as described herein to remove disulfides from hydrocarbon matrixes in a variety of matrices in artificial and natural disulfide-containing samples.

Example 1

Disulfide Wash

Disulfide wash for scale up of anti-corrosion. Prepare an aqueous phase of 5% acetic acid with ~2 grams of Zn per 50 mL of water. The hydrocarbon containing the disulfides is washed with an equal volume of disulfide wash by rigorously shaking the biphase mixture for 40 minutes at 40° C. The sample is then centrifuged and the petroleum layer (top layer) is kept and is considered void of disulfides.

Example 2

Caustic Wash for Removal of Mercaptans

Prepare a solution of 20% (wt/wt) sodium hydroxide in methanol, this is called base wash solution. The hydrocarbon containing the mercaptans is washed with an equal volume of base wash by rigorously shaking the biphase mixture for 5 minutes. The sample is then centrifuged and the petroleum layer (top layer) is kept and is considered void of mercaptans.

The aforementioned methods may be applied to batch processing of petroleum samples or within conduits of petroleum process streams in need of disulfide reduction or susceptible to corrosion which includes but is not limited to piping, fittings and storage equipment.

For any figure shown and described herein, one or more of the components may be omitted, added, repeated, and/or substituted. Additionally, it should be understood that in certain cases components of the example systems can be combined or can be separated into subcomponents. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", and "within" are used merely to distinguish one component (or part of a component or state of a component) from another. Such terms are not meant to denote a preference or a particular orientation unless so indicated by the context, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a", "an", and "the" are intended to include plural alternatives, e.g., at least one. The terms "including", "with", and "having", as used herein, are defined as comprising (i.e., open language), unless specified otherwise.

When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as "about", from "about" one particular value, and/or to "about" another particular value. When such values, or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method of reducing corrosivity in a petroleum matrix comprising:
   (i) selectively reacting a first petroleum matrix comprising disulfides with an aqueous acid wash composition in the presence of a metal to convert the disulfides to mercaptans thereby producing a second petroleum matrix enriched in mercaptans and a spent aqueous acid wash composition;
   (ii) separating the second petroleum matrix from the spent aqueous acid wash composition;
   (iii) contacting the second petroleum matrix with a caustic wash to produce a third petroleum matrix depleted in mercaptans and a spent caustic wash enriched in mercaptans; and
   (iv) separating the third petroleum matrix from the spent caustic wash;
   wherein the metal in (i) is selected from the group consisting of magnesium, aluminum, cadmium, copper and nickel.

2. The method of claim 1, wherein the acid in the aqueous acid wash composition is a weak acid.

3. The method of claim 2, wherein the weak acid is selected from the group consisting of carboxylic acids and oxyacids acids.

4. The method of claim 3, wherein the acid is at a concentration of 3 to 6%.

5. The method of claim 1, wherein the petroleum matrix comprises a crude oil.

6. The method of claim 2, wherein the weak acid comprises acetic acid.

7. The method of claim 1, wherein the caustic wash comprises methanolic sodium hydroxide.

8. The method of claim 1, wherein the separating in (ii) and (iv) comprises centrifugation.

9. The method of claim 1, wherein the disulfides comprise one or more of the following: methyl disulfide, ethyl disulfide, n-propyl disulfide, isopropyl disulfide, n-butyl disulfide, sec-butyl disulfide, tert-butyl disulfide, n-amyl disulfide, tert-amyl disulfide, cyclopentyl disulfide, n-octyl disulfide, n-decyl disulfide, phenyl disulfide, benzyl disulfide, and p-tolyl disulfide.

* * * * *